United States Patent [19]

Kalkbrenner et al.

[11] Patent Number: 4,538,956
[45] Date of Patent: Sep. 3, 1985

[54] WORKPIECE GRIPPING AND MANIPULATING APPARATUS FOR LASER WELDING SYSTEMS AND THE LIKE

[75] Inventors: Ralph W. Kalkbrenner, Irwin; Richard M. Kobuck, Delmont, both of Pa.

[73] Assignee: Westinghouse Electric Corp., Pittsburgh, Pa.

[21] Appl. No.: 414,262

[22] Filed: Sep. 1, 1982

[51] Int. Cl.³ .............................................. B66C 23/00
[52] U.S. Cl. ...................................... 414/735; 269/50; 294/67.33; 294/86.4; 294/902; 901/6; 901/42
[58] Field of Search ............... 414/741, 735, 730, 729; 901/30, 39, 42, 6; 294/67 BB, 81 R, 86 R, DIG. 2; 269/252, 46, 50-52; 228/47

[56] References Cited

U.S. PATENT DOCUMENTS

| | | | |
|---|---|---|---|
| 2,689,412 | 9/1954 | Young | 269/46 X |
| 3,438,510 | 4/1969 | Fawell | 294/86 R X |
| 3,527,469 | 9/1970 | Gobin | 280/47.37 R |
| 3,913,820 | 10/1975 | Valentine | 901/14 X |

FOREIGN PATENT DOCUMENTS 819038  4/1981  U.S.S.R. ................. 294/67 BB

Primary Examiner—Robert J. Spar
Assistant Examiner—Donald W. Underwood
Attorney, Agent, or Firm—Douglas E. Erickson

[57] ABSTRACT

A workpiece handling assembly for gripping, manipulating and releasing a fixtured workpiece assembly for transport to and from and positioning in a workpiece welding station and the like by a hoist to minimize contamination of the welds comprising an inverted generally "U" shaped gripping and manipulating gripping device including a telescopically extensible horizontal crossbeam structure having depending support arms extending downwardly from opposite ends thereof. The lowermost ends of said arms have pivoted gripper jaw members journaled therein for rotary movement about a common horizontal axis, including foot formations shaped to interfit and grip convergent grip edges of triangular protrusions projecting from the workpiece. The gripper jaw members are movable to and from gripping relation with the triangular protrusions, and the gripper jaw members can be latched at diametrically opposite angular positions to support the workpiece in either of two relatively inverted positions. A mounting plate is provided for the workpiece having cantilevered and eccentrically mounted latching pins associated with locating pins to latch the workpiece on the mounting plate.

9 Claims, 9 Drawing Figures

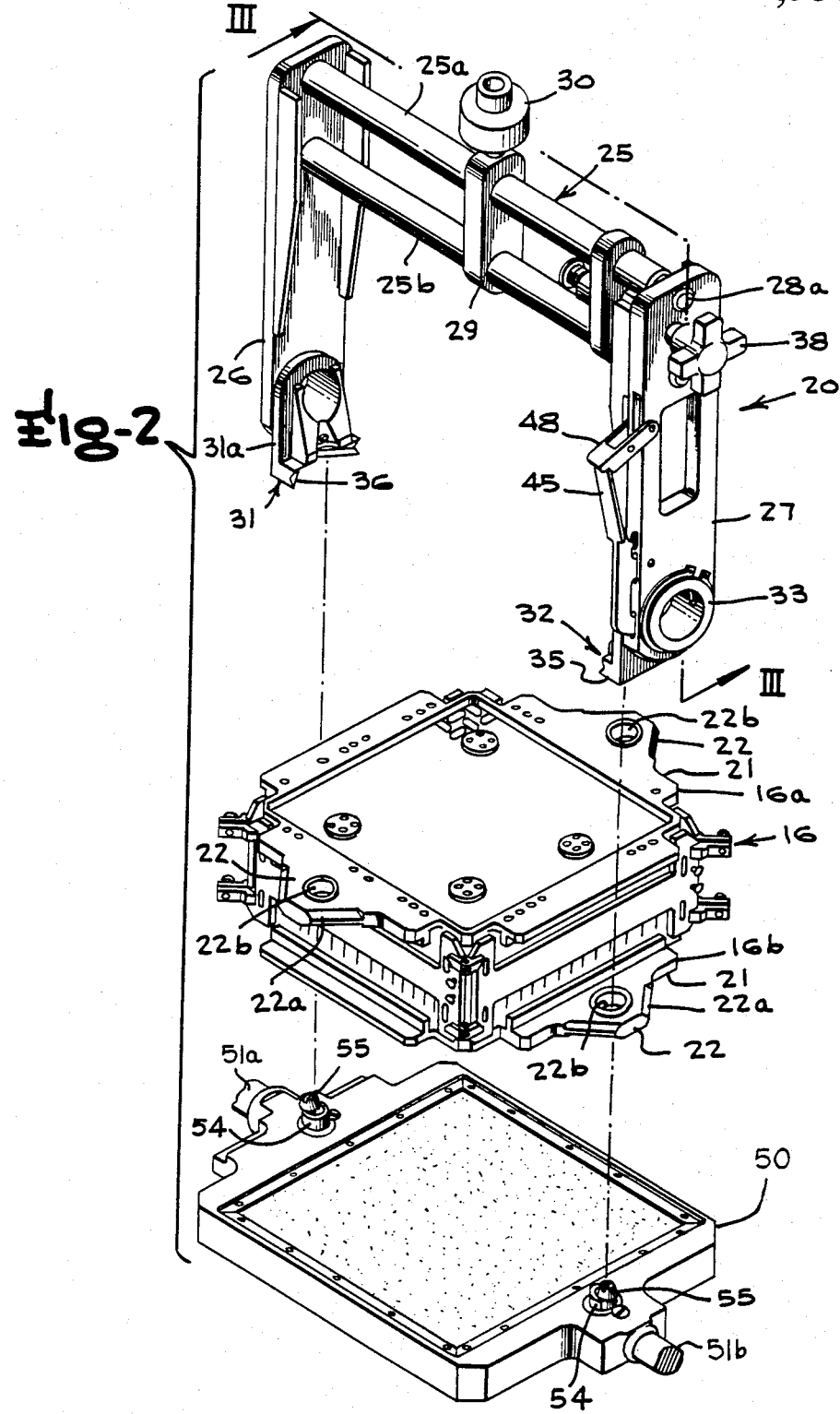

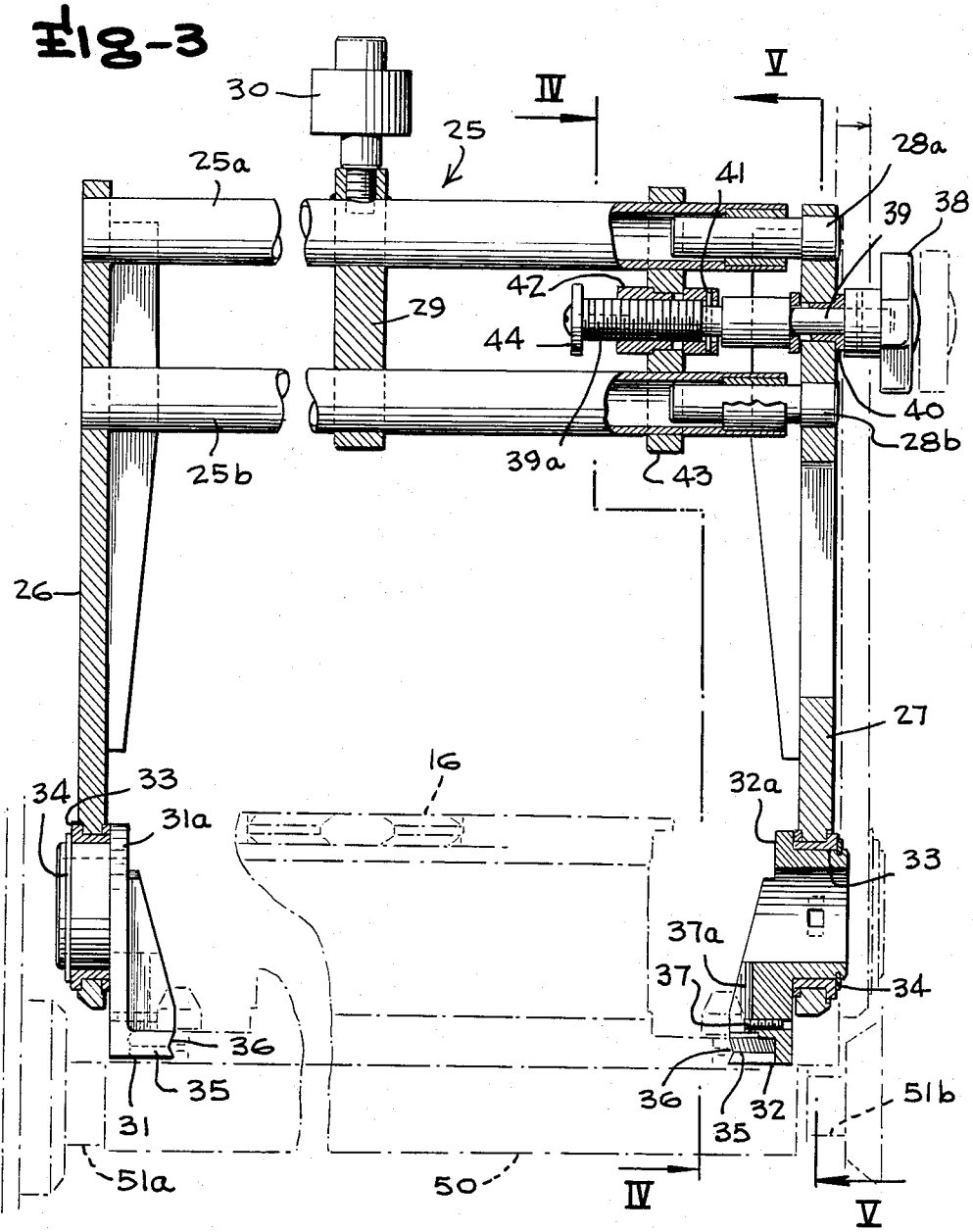

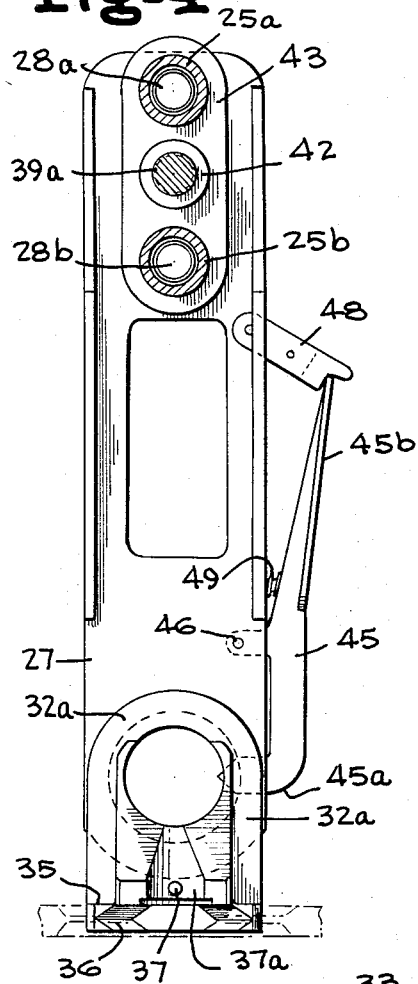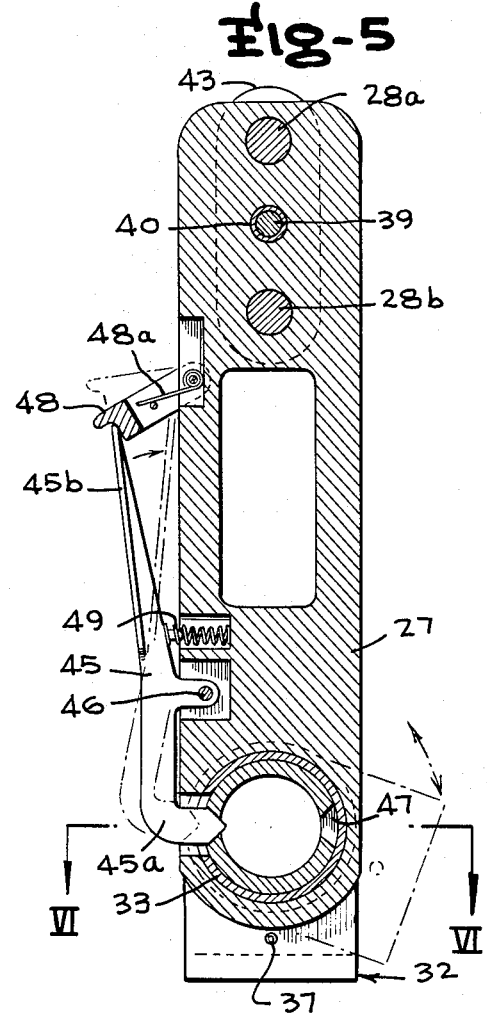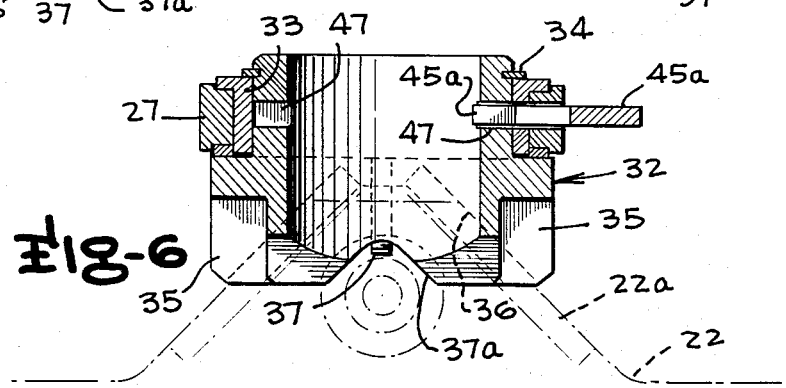

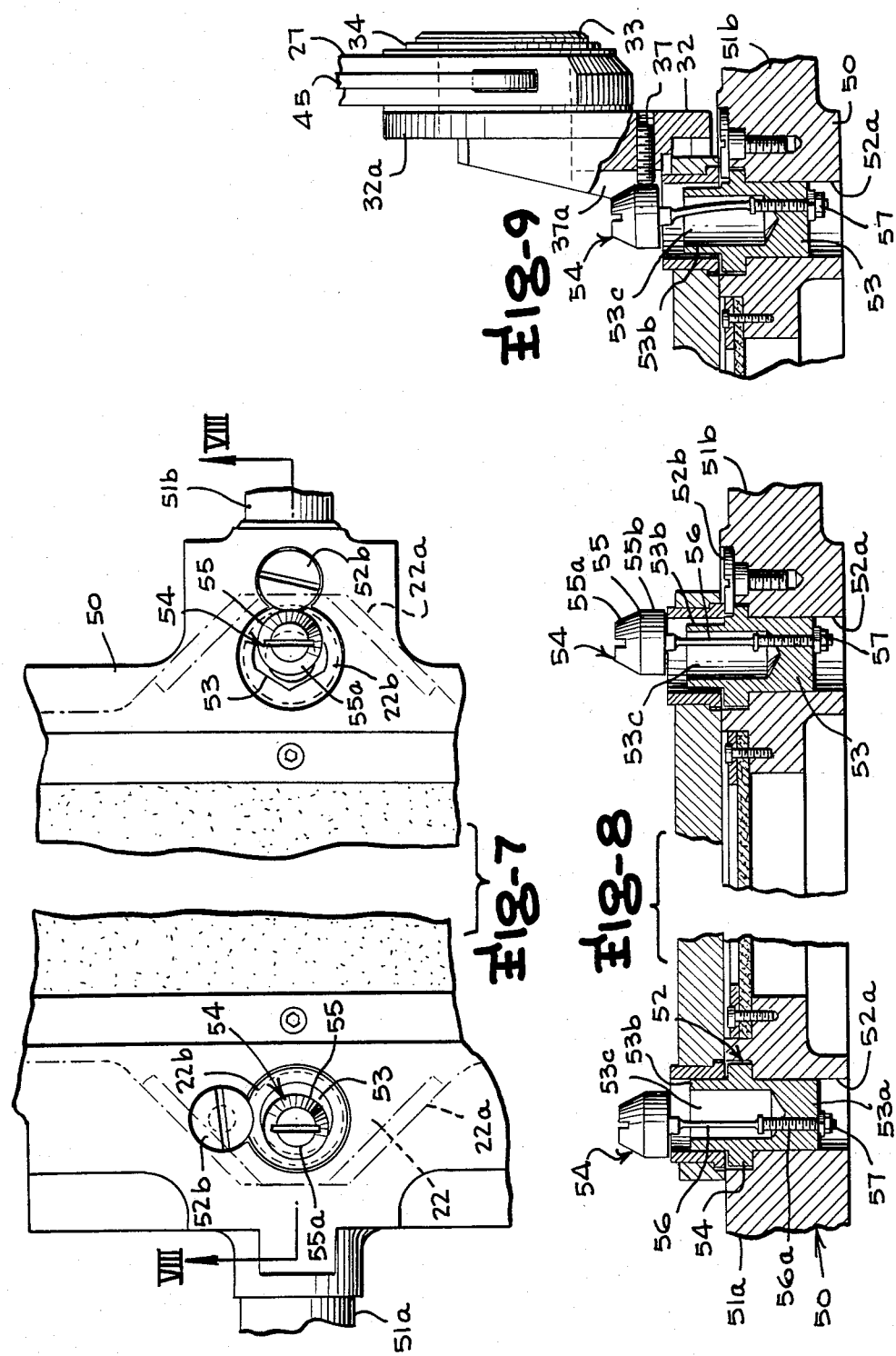

WORKPIECE GRIPPING AND MANIPULATING APPARATUS FOR LASER WELDING SYSTEMS AND THE LIKE

CROSS-REFERENCE TO COPENDING APPLICATIONS

Attention is drawn to the following copending, commonly assigned applications, all/each filed on even date and incorporated specifically by reference into the instant specification:

(1) "FUEL GRID WITH SLEEVES WELDED IN NOTCHED GRID STRAPS" by R. Duncan, Ser. No. 414,232 now U.S. Pat. No. 4,521,374;

(2) "PULSED LASER MACHINING APPARATUS", by R. A. Miller and G. D. Bucher, Ser. No. 414,264;

(3) "APPARATUS AND METHOD FOR LASER MACHINING IN NON-REACTIVE ENVIRONMENT", by R. A. Miller and G. G. Lessman, Ser. No. 414,242, now U.S. Pat. No. 4,492,843;

(4) "STRAP AND VANE POSITIONING FIXTURE FOR FUEL ROD GRID AND METHOD", by R. F. Antol, R. W. Kalkbrenner and R. M. Kobuck, Ser. No. 414,197;

(5) "GRID ASSEMBLY FIXTURE, RETENTION STRAP AND METHOD", by R. M. Kobuck and R. W. Kalkbrenner, Ser. No. 414,198, now U.S. Pat. No. 4,519,593;

(6) "LASER MACHINING SYSTEM", by D. L. Wolfe, J. W. Clements and J. S. Kerrey, Ser. No. 414,241;

(7) "MOVABLE MACHINING CHAMBER WITH ROTATABLE WORK PIECE FIXTURE", by R. F. Antol, R. Kalkbrenner and D. L. Wolfe, Ser. No. 414,263, now U.S. Pat. No. 4,501,949;

(8) "LASER LENS AND LIGHT ASSEMBLY", by R. Antol, R. Kalkbrenner and R. Kobuck, Ser. No. 414,205, now U.S. Pat. No. 4,518,843;

(9) "WELDING PLATES FOR A FUEL ROD GRID", by R. M. Kobuck, R. Miller, R. W. Kalkbrenner, J. Kerrey and R. Duncan, Ser. No. 414,265, now U.S. Pat. No. 4,492,844;

(10) "PLURAL COMPUTER CONTROL FOR SHARED LASER MACHINING", by J. W. Clements and W. D. Lanyi, Ser. No. 414,204;

(11) "GRID AND SLEEVES WELDING FIXTURE AND METHOD", by J. S. Kerrey and R. Duncan, Ser. No. 414,203, now U.S. Pat. No. 4,522,330;

(12) "CALIBRATION OF AUTOMATED LASER MACHINING APPARATUS" by J. W. Clements and J. R. Faulkner, Ser. No. 414,272; and

(13) "RIGID SUPPORT FOR LASER MACHINING APPARATUS", by D. L. Wolfe, Ser. No. 414,191, now U.S. Pat. No. 4,493,967

BACKGROUND OF THE INVENTION

Field of the Invention

The present invention, in the preferred form, relates in general to workpiece gripping and manipulating apparatus for use with article handling devices for quick connection and disconnection with a workpiece and transfer of the workpiece to and from a processing station for manipulation through a sequence of predetermined positions, and more particularly to workpiece gripping and manipulating apparatus for use in a computer controlled precision laser welding system for quick connect gripping and release and positioning of fixtured workpieces, specifically fuel rod grids for nuclear fuel assemblies.

The workpiece gripping and manipulating apparatus of the present invention is specifically designed for use with precision laser welding apparatus designed to manufacture nuclear fuel bundle assemblies by computer controlled laser welding apparatus as disclosed in detail in the related companion patent application designated Ser. No. 414,241 in the names of Don L. Wolfe, Jack W. Clements and J. S. Kerrey. As described more particularly in that related patent application, the laser welding system includes a pair of positioning modules and associated welding chambers, wherein fixtured workpieces formed of an array of metal straps arranged in proper position to be laser welded at various intersections and slot and tab locations are positioned on a mounting fixture and are to be transferred into the welding area for aligning and positioning in a computer controlled series of steps. As described in the related patent application Ser. No. 414,241, the prior art has recognized the problem of fretting corrosion wherein the surfaces of fuel rod grids and fuel rods in nuclear fuel assemblies rub against each other increasing the likelihood of weld contamination and eventual mechanical failure of the fuel rod grids. Fuel rod assemblies including the fuel rods and grids are designed to be disposed within the hostile atmosphere of a boiling water reactor (BWR) or pressurized water reactor (PWR), wherein the coolant typically in the form of water is superheated to temperatures of the order of 600° F. Under such conditions, any contamination and in particular fretting corrosion is enhanced. It has been recognized in the literature that the welding of grid and rod materials such as zirconium alloys in a contaminated welding atmosphere leads to contaminated welds which may bring about eventual joint failure in the nuclear fuel assembly. In particular, zirconium alloys are especially prone to direct oxidation of the metal by scraping action encountered in the nuclear reactors. Experience has shown that welds produced in a relatively impure atmosphere will result in a weld with an initially low degree of contamination that, when subjected to the harsh atmosphere of a nuclear reactor, will be particularly subject to fretting contamination. Thus, it is particularly critical that any welding of Zircaloy and in particular, laser welding, be conducted in a controlled, pure atmosphere to insure that weld contamination is minimized and will not deteriorate under the hostile conditions of a nuclear reactor.

The companion related U.S. patent application, Ser. No. 414291, thus discloses a system for achieving automated laser welding of highly reactive materials such as Zircaloy, wherein the workpiece is sequentially moved under an automated controller to effect a number of precision welds, while maintaining an exceptionally high degree of purity of the surrounding atmosphere to avoid contamination of the welded material. To achieve the precise welds required with parts of small dimension, making up the nuclear rod grids, the Zircaloy straps precisely positioned as required in the finished grid are positioned in a fixtured grid assembly, which must be introduced into and withdrawn from associated welding chambers in positioning modules in as efficient a manner as possible and in a way which achieves the goal of minimum contamination.

SUMMARY OF THE INVENTION

Conventional means for loading and securing the fixtured grid for use with the automated laser welding apparatus were considered inadequate, as the fixtured workpiece and available grip devices for handling the fixtured workpiece were considered too heavy for unassisted manual loading. Also the stringent requirements for environment purity within the weld chamber preclude manual lifting. With these considerations, and the desire to achieve a short loading time cycle and minimize vulnerability of the tooling to damage, a passive restraint device providing a material handling system for transferring and manipulating the fixtured workpieces is desired. The laser welding system of said companion patent application therefore includes a mechanical assist lifting hoist, which may be of any of several commercially available types, which is preferably of the balance arm type illustrated herein and in the said companion application which multiplies the operator's function and overcomes inertia of the fixtured workpiece being handled thereby permitting movement of the workpiece by using natural body motions. The present invention provides a workpiece gripping and manipulating assembly to be coupled to and supported by the mechanical lifting hoist which has gripper jaws constructed to provide quick connection with tapered triangular projections or protrusions on the workpiece supporting fixtures and quick disconnect therefrom, and which cooperate with latching/locating pins on a rotatable mounting plate provided in the welding chamber for inversion of the workpiece for properly locating, latching and releasing the fixtured workpiece.

BRIEF DESCRIPTION OF THE DRAWINGS

A detailed description of a preferred embodiment of this invention is hereafter made with specific reference to the drawings, in which:

FIG. 2 is an exploded perspective view of the gripping and manipulating assembly and a rotary fixture mounting plate with the latching/locating pin structure embodying the present invention for gripping, locating and latching the fixtured workpiece to be welded;

FIG. 3 is a vertical section view through the gripping and manipulating assembly, taken along the line III—III of FIG. 2;

FIGS. 4 and 5 are vertical section views through the gripping assembly taken along the lines IV—IV and V—V of FIG. 3;

FIG. 6 is a horizontal section view through one of the vertical support arms of the gripping assembly, taken along the line VI—VI of FIG. 5, and showing a portion of the fixtured workpiece in phantom lines;

FIG. 7 is a fragmentary top plan view of the rotatable fixture assembly mounting plate in each welding chamber, incorporating the locating/latching pin structure of the present invention;

FIG. 8 is a vertical section view taken along the line VIII—VIII of FIG. 7; and

FIG. 9 is a fragmentary vertical section view of one of the locating/latching pins and adjacent portions of fixture assembly mounting plate similar to portions of FIG. 8, showing the lower end portion of the adjustable gripping assembly support arm positioned to displace the locating/latching pin to release position.

DETAILED DESCRIPTION OF A PREFERRED EMBODIMENT

Figure 1:
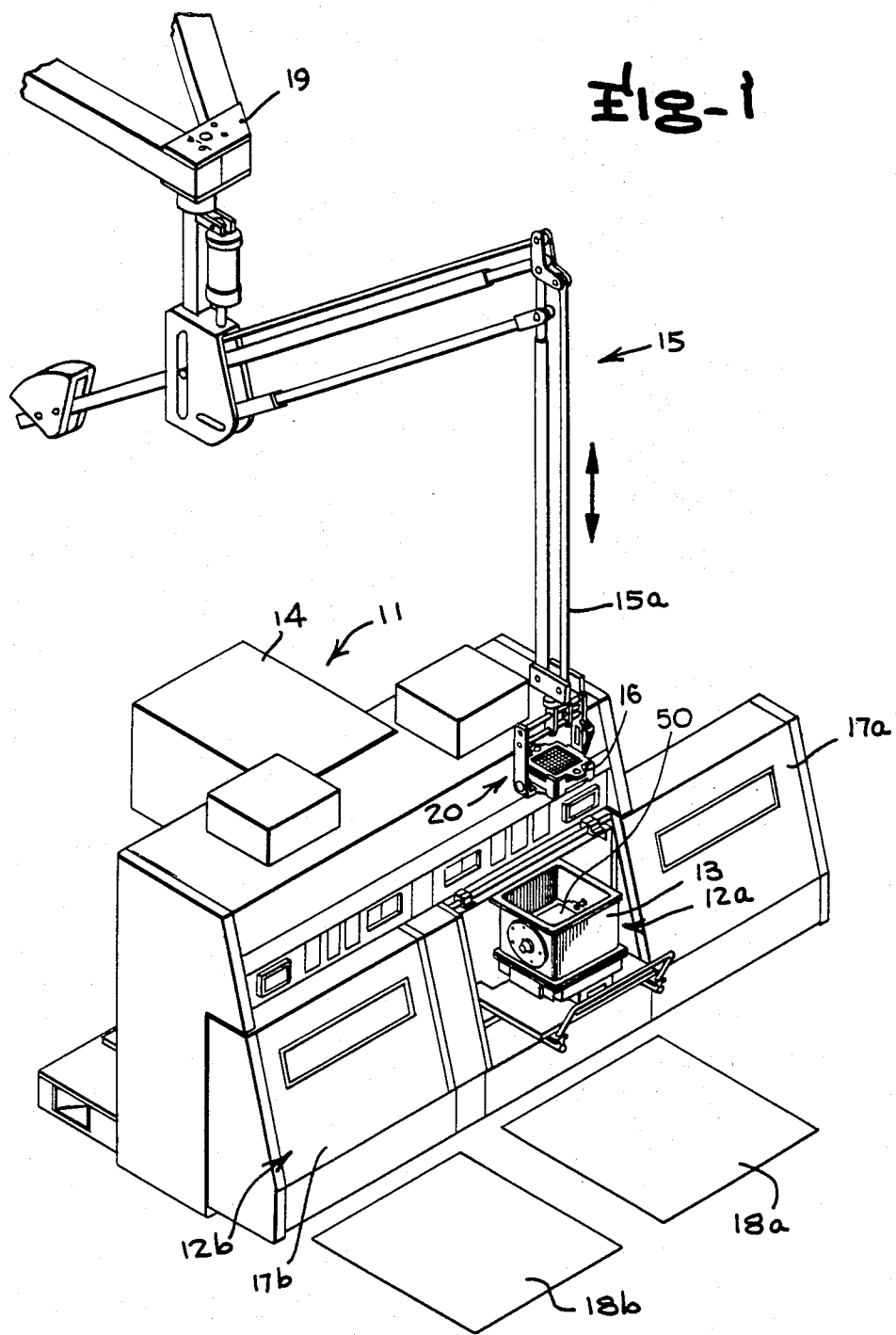
FIG. 1 is a perspective view of the positioning module and associated welding chamber components, and the mechanical assist lifting hoist components of the laser welding system with which the gripping apparatus and latching/locating pin structure of the present invention is associated.

Referring to the drawings, wherein like reference characters designate corresponding parts throughout the several figures, the fixtured grid gripping and manipulating assembly and the locating/latching pin structure of the present invention is developed to be used in the laser welding system indicated generally by the reference character 11, having a pair of positioning modules 12a and 12b located in side-by-side, tandem relation, and each associated with a respective welding chamber, one of which is shown at 13 in FIG. 1. The assembly also includes a laser and optical mount subsystem, indicated at 14, together with a mechanical assist balance arm type lift hoist, generally indicated at 15, and additional components, not shown, such as a laser power supply, computer control system consoles, which are illustrated in the related companion application, U.S. Ser. No. 414291. The system is designed to process a fuel rod grid, indicated generally at 16, formed of inner and outer grid straps secured together in a fixtured workpiece assembly, to achieve a series of welds, such as intersect welds, slot and tab welds, and corner seam welds, and notch seam welds, as described in the said companion application, by successively and precisely positioning the fixtured fuel rod grid 16 in the weld chambers associated with the modules 12a, 12b, controlling the laser system 14 to emit a laser beam of controlled energy, and controlling the supply of a suitable inert gas, such as argon, to carry out the laser welding of these welds. The welding chamber 13 respectively associated with each of the positioning modules 12a, 12b is designed to receive its grid 16 to establish an environment in which the laser welding may be carried out in an atmosphere of inert gas, while permitting the movement of the grid 16 to effect the series of welds. Each positioning module 12a, 12b has an associated cabinet door 17a, 17b, the right cabinet door 17a being shown in open position while the left cabinet door 17b is shown in closed position. Also shown in FIG. 1 are a pair of sensing mats 18a, 18b forming right and left safety zones, located immediately in front of the right and left positioning modules 12a, 12b, to sense the presence of an operator on the respective mat and prevent driving of its corresponding welding chamber into a position outside of the associated cabinet.

The mechanical assist lifting hoist 15 is a commercially available lift hoist structure to relieve the burden on the operator in positioning and manipulating the fixtured grid 16 and facilitate the production and withdrawal of the fixtured grid relative to the positioning modules 12a, 12b, and shorten the loading and unloading cycle, and for example may be a lift hoist of the commercially available type known as the Balance Master produced by Conco. The lift hoist 15 may be supported in the conventional manner from an overhead beam structure, indicated generally at 19 and include counter-balanced arms moveable as a balanced arm system for pivotal movement about a vertical pivot axis and linked so that the outermost arm section 15a is moveable vertically and also horizontally inwardly and outwardly toward the vertical pivot axis. The lower end portion of the outermost arm section 15a of the lift hoist 15 has a conventional coupling mechanism for removably connecting to this lift hoist the gripping and manipulator assembly, generally indicated at 20, of the present invention for gripping the fixtured grid assembly 16 and assisting in loading of the same into the welding chamber 13 of either of the two positioning modules 12a, 12b and facilitate manipulation of the fixtured grid assembly as hereinafter described.

Referring more particularly to FIGS. 2 and 3, the gripping and manipulating assembly 20 is constructed to facilitate knob controlled gripping and release of the fixtured grid assembly 16 which, in the illustrated embodiment more particularly described in a related companion patent application designated Ser. No. 414,198, includes what are referred to as a vane side welding plate 16a, a sleeve side welding plate 16b, a retention strap, and other components. Each of the vane side plates 16a and sleeve side welding plates 16b is of generally square plan form and includes extensions 21 along two opposite sides having truncated triangular protrusions 22 extending therefrom to assist in the accurate positioning of the fixtured grid assembly 16, the outwardly converging angled sides of the triangular protrusions having beveled edges as indicated at 22a. These truncated triangular protrusions 22 each have a hole provided with a precision bushing, indicated at 22b, precisely positioned so as to cooperate with pins on a rotatable mounting plate, hereinafter described, in the welding chamber, to precisely locate the entire fixtured grid assembly 16 to insure that it is accurately positioned during the welding procedure.

The gripping and manipulating assembly 20 is in the general configuration of an inverted "U" shaped structure formed generally of a longitudinally adjustable cross beam structure 25 and a pair of downwardly extending plate-like support arms 26, 27. The upper horizontal cross beam structure 25 is formed of a vertically aligned pair of horizontal tube members 25a and 25b welded or otherwise assembled to what is referred to as the stationary support arm 26, and a pair of vertically aligned rod members 28a, 28b fixed to what is referred to as the adjustable support arm 27, are telescopically inserted into the bores of the tubular members 25a, 25b. A coupler, formed of a block member 29 apertured to receive the tube members 25a, 25b therethrough and threaded at the top to be threadedly connected to a coupler head formation 30 is positioned approximately midway along the length of the cross beam structure 25 and fixed on the uppermost tube by the threaded portion of the coupler head formation 30, with the head removably assembled with the coupler mechanism at the lower end of the outermost arm section 15a of the lift hoist 15.

The lower end portions of the downwardly extending support arms 26, 27 are provided with gripper jaws 31, 32 of generally "L" shaped profile, as best shown in FIG. 3, having an annular pivot bushing formation 33 projecting from the vertical leg portion 31A, 32A of the gripper jaws extending through and journaled for rotation in appropriately sized openings in the lower portions of the support arms 26, 27 and retained therein by a retaining ring 34. The foot portions 35 at the bottom of the gripper jaws 31, 32 project toward each other and are provided with "V" shaped through surfaces 36 at their confronting edges shaped to conform to and receive gripping relation the beveled edges 22a of the triangular protrusions 22 on the welding plates 16a or 16b of the grid assembly 16 to be handled thereby. Each of the gripper jaws is also provided with a threaded screw hole receiving an adjusting screw 37 which projects inwardly a short distance from the inner face of the gripper jaw vertical leg portion 31a, 32a for the purpose later described.

The support arm subassemblies 26, 27 are moveable toward and away from each other to quickly grip and release the fixtured fuel rod grid assembly 16 to be handled thereby, by reason of the telescopic upper cross beam structure 25 formed by the rod members 28a, 28b and the tube members 25a, 25b. The advancing and retracting movement of the support arm 27 relative to the support arm 26 is under control of a manual hand knob 38 fixed by a roll pin to a shaft 39 journaled in a thrust bearing 40 in the upper portion of the support arm 27 at a location between the rod members 28a, 28b and having a threaded end portion 39a extending through a spacer nut 41 and an adjustment bushing 42 in the plate 43 fixed to the tube members 25a and 25b. A washer and screw 44 is provided on the end of the threaded portion 39a of shaft 39 to serve as a stop limiting movement of the support arm 27 away from the support arm 26.

The gripping and manipulating assembly 20 is also provided with the capability of readily inverting the grid assembly while gripped between the foot portions 35 of the gripper jaws 31, 32 from one horizontal position to an inverted horizontal position rotated 180° about the horizontal center axis through the pivot bushing formations 33 of the gripper jaws. To accomplish this, a pivoted locking lever 45 is provided on the moveable support arm 27, pivoted as indicated at 46 and having a pointed nose formation 45a extending through an aperture in the support arm 27 into locked relation in one of two "V" slots 47 provided at diametrically opposite locations in the pivot bushing formation 33 of the gripper jaw 32 located circumferentially 180° apart. The locking lever 45 includes a handle portion 45b extending from the pivoted midportion of the lever in the direction opposite the nose formation 45a, co-acting with a pivoted catch member 48 biased by a tortion spring 48a to normal latching position and biased toward the bushing docking position by a compression spring 49. To release the rotatable gripper jaw 32 from locked relation with the locking lever nose 45a for rotation of the grid 16 and gripper jaws to an inverted position, the operator need merely flip up the catch member 48 and press the handle portion 45b of the locking lever toward the support arm 27 to the broken line position shown in FIG. 5 and manually rotate the grid through 180° to the inverted position, the lever 45 being released during such rotation so that its nose formation 45a then enters the other slot 47 in the bushing formation 33 of the gripper jaw 32 and thereby precisely locates the grid in the inverted position.

The gripper jaw subassemblies on the support arms 26, 27 of the gripping and manipulating assembly 20 co-act with passive latching devices provided on a rotatable fixtured grid assembly mounting plate provided within each welding chamber 13 of the positioning modules 12a, 12b. Referring specifically to FIGS. 3, 7, 8 and 9, a rotatable fixtured grid assembly mounting plate 50, shown in phantom lines in FIG. 3 and in solid lines in FIGS. 7-9, is provided in each of the welding chambers 13 and supported in a manner permitting its rotation about the horizontal center axis of the shaft members 51a and 51b. The rotatable mounting plate 50 is provided with wells or cavities 52 in which are provided fixed locating pins 53 which, in the illustrated embodiment, are of vertically elongated cylindrical configuration having an intermediate collar or flange 54 and cylindrical portion 53a extending therebelow received in lower cylindrical portion 52a of cavity 52 in the mounting plate 50 and captured therein by the heads of restraining screws 52b. The locating pins 53 also have an upwardly protruding cylindrical portion 53b of appropriate diameter to be received in and extend for a desired distance upwardly into the bores of the bushings 22b in the triangular protrusions 22 of the fixture plates of the fixtured fuel rod grid assembly 16. The upwardly protruding portions 53b of the locating pins 53 are positioned to precisely locate the fixtured grid 16 on the mounting plate 50 and include an upwardly opening socket or well 53c in which is mounted a cantilevered and eccentrically mounted latching pin member 54.

The latching pin member 54 is provided to facilitate guided assembly and latching of the fixtured grid 16 onto the mounting plate 50 and disassembly of the fixtured grid, and to this end comprises an enlarged head formation 55 having a truncated conical upwardly convergent or beveled portion 55a and a cylindrical portion 55b, and a downwardly extending flex shank 56, which is of flat blade-like configuration in the illustrated embodiment, terminating in a threaded lower portion 56a extending through a suitably sized bore therefor in the lower portion 53a of the locating pin and secured therein by the nut 57. As will be apparent from FIGS. 8 and 9, the latching pin 54 is eccentrically positioned relative to the vertical center axis of the locating pin 53 so that the cylindrical portion 55b of the head upon passage through the center bore of one of the fixture plate bushings 22b will extend in overlapping relation to the fixture plate protrusion bushing 22b and latch the fixture plate in assembled and aligned position on the locating pins 53 and plate 50 as illustrated in FIG. 8.

As previously referred to, the two gripper jaws 31, 32 of the gripping and manipulating assembly 20 are provided with adjusting screws 37 and with associated recesses 37a disposed to receive the conically tapered head portions 55 of the flexibly movable eccentric latching pins 54 and the adjusting set screws 37 are adjusted to protrude into these recesses 37a a proper amount to engage the latching pin heads 55 when the gripper jaws 31, 32 of the gripping and manipulating assembly 20 reach the fixtured grid mounting position shown in FIG. 9 wherein the fixtured grid is properly located and seated on the mounting plate 50. The screws 37 cause the heads 55 of the flexible latching pins 54 to be flexed into approximate centered position relative to the locating pins 53 and the center axis of the fixture plate bushings 22b so that the latching pin heads 55 are withdrawn from lapping, latching relation with the bushings 22b and release the bushings to be withdrawn upwardly from the mounting plate 50 when the gripper jaws 31, 32 are adjusted to grip the triangular fixture protrusions 22. Of course, during downward or loading movement of the fixtured grid assembly to mounted position on the mounting plate 50, the tapered or conical portion 55a of the latching pin heads 55 are engaged by the surfaces of the fixture plate protrusion bushings 22b bounding the center openings in the bushings to flex or cam the latching pin heads 55 to substantially centered positions relative to their associated locating pins 53 thus assisting in guiding the protrusion bushings onto the upwardly projecting portions 53b of the locating pins 53.

It will be understood that the fixtured grid assemblies 16 may thus be readily assembled with the gripping and manipulating assembly 20 by operation of the hand knob 38 to advance the moveable support arm 27 and its associated gripper jaw 32 toward the support arm 26 and gripper jaw 31 from a wider spacing appropriate to accomodate the triangular protrusions 22 of the grid assembly plates 16a, 16b therebetween to a closer spacing interfitting the beveled edges 22a of the protrusions 22 in the "V" troughs at edges 36 of the gripper jaws 31, 32 and the mechanical assist lift hoist 15 is then manipulated to transport the gripped fixtured grid 16 to the welding chamber 13 of the appropriate module 12a, 12b. There, the lift hoist 15 is manipulated to lower the gripped fixtured grid 16 into the welding chamber 13 into assembled relation mounted on the mounting plate 50, during which the tapered heads 55 of the flexible latching pins 54 are flexed by engagement with the protrusion bushings 52b to a position assisting guiding of the fixture plate bushings onto the fixed locating pins 53. The knob 38 of the gripping and manipulating assembly 20 is then actuated to retract the gripper jaws 31, 32 from gripping relation with the fixture plate protrusions 22, whereupon the gripping and manipulating assembly 20 is withdrawn from the welding chamber 13, the door 17a for the module 12a is closed, and the laser welding system then proceeds through its computer controlled welding and fixtured grid positioning cycles. Upon completion of the welding procedure, the module door, for example 17a, is retracted, the welding chamber 13 moved outwardly to expose the fixtured grid 16, the lift hoist 15 is then manipulated to move its supported gripping and manipulating assembly 20 into the welding chamber to horizontally align the gripper jaws 31, 32 with the protrusions 22 of the appropriate fixture plates of the fixtured grid assembly, and upon manipulation of the hand knob 38 to dispose the gripper jaws in gripping relation with the fixture plate protrusions 22, the adjusting screws 37 are brought into engagement with the heads 55 of the latching pins 54 to flex them to the release position shown in FIG. 9, substantially centered with the associated protrusion bushings 22b and locator pins 53, thus permitting upward retraction of the fixtured grid 16 from the mounting plate.

We claim:

1. A workpiece handling assembly for gripping, manipulating and releasing a fixtured workpiece assembly for transport to and from and positioning in a workpiece welding station and the like by hoist means to minimize contamination of the welds produced therein, the workpiece being formed of an array of metal members and fixture plate members therefor assembled in a fixtured grid assembly wherein generally triangular protrusions project oppositely from the fixtured plate members and have precision convergent grip edges and precision apertured locating holes therein; said workpiece handling assembly comprising an inverted generally "U" shaped gripping and manipulating gripping device including a telescopically extensible horizontal crossbeam structure having depending support arms extending downwardly from opposite ends thereof, the lowermost ends of said arms having pivoted gripper jaw members journaled therein for rotary movement about a common horizontal axis including foot formations having confronting shaped contact surfaces to interfit and grip said convergent grip edges, rotatable adjusting screw means coupled with said crossbeam structures and one of said support arms for moving the latter toward and away from the other support arm to move said gripper jaw members to and from gripping relation with said grip edges of said triangular protrusions, and means for restraining at least one of said gripper jaw members at diametrically opposite angular positions about the pivot axis thereof to support the workpiece in either of two relatively inverted positions, and wherein said telescopically extensible crossbeam structure comprises a vertically spaced pair of parallel elongated horizontally disposed tube members fixed to one of said support arms and a pair of similarly spaced horizontal rods fixed to the other support arm and telescopically interfitted into said tube members, and said adjusting screw means includes a shaft journaled in one of the support arms having a hand knob for manipulation thereof and a screw thread portion threaded into nut means coupled to said crossbeam structure to effect extension and contraction of the crossbeam structure.

2. A workpiece handling assembly for gripping, manipulating and releasing a fixtured workpiece assembly for transport to and from and positioning in a workpiece welding station and the like by hoist means to minimize contamination of the welds produced therein, the workpiece being formed of an array of metal members and fixture plate member therefor assembled in a fixtured grid assembly wherein generally triangular protrusions project oppositely from the fixtured plate members and have precision convergent grip edges and precision apertured locating holes therein; said workpiece handling assembly comprising an inverted generally "U" shaped gripping and manipulating gripping device including a telescopically extensible horizontal crossbeam structure having depending support arms extending downwardly from opposite ends thereof, the lowermost ends of said arms having pivoted gripper jaw members journaled therein for rotary movement about a common horizontal axis including foot formations having confronting shaped contact surfaces to interfit and grip said convergent grip edges, rotatable adjusting screw means coupled with said crossbeam structures and one of said support arms for moving the latter toward and away from the other support arm to move said gripper jaw members to and from gripping relation with said grip edges of said triangular protrusions, and means for restraining at least one of said gripper jaw members at diametrically opposite angular positions about the pivot axis thereof to support the workpiece in either of two relatively inverted positions, wherein said convergent grip edges of said fixture plate members are beveled edges of "V" shaped cross-section and said shaped contact surfaces of the foot members of said gripper jaw members are "V" shaped trough surfaces to interfit said beveled edges, and wherein said telescopically extensible crossbeam structure comprises a vertically spaced pair of parallel elongated horizontally disposed tube members fixed to one of said support arms and a pair of similarly spaced horizontal rods fixed to the other support arm and telescopically interfitted into said tube members, and said adjusting screw means includes a shaft journaled in one of the support arms having a hand knob for manipulation thereof and a screw thread portion threaded into nut means coupled to said crossbeam structure to effect extension and contraction of the crossbeam structure.

3. A workpiece handling assembly for gripping, manipulating and releasing a fixtured workpiece assembly for transport to and from and positioning in a workpiece welding station and the like by hoist means to minimize contamination of the welds produced therein, the workpiece being formed of an array of metal members and fixture plate members therefor assembled in a fixtured grid assembly wherein generally triangular protrusions project oppositely from the fixtured plate members and have precision convergent grip edges and precision apertured locating holes therein; said workpiece handling assembly comprising an inverted generally "U" shaped gripping and manipulating gripping device including a telescopically extensible horizontal crossbeam structure having depending support arms extending downwardly from opposite ends thereof, the lowermost ends of said arms having pivoted gripper jaw members journaled therein for rotary movement about a common horizontal axis including foot formations having confronting shaped contact surfaces to interfit and grip said convergent grip edges, rotatable adjusting screw means coupled with said crossbeam structures and one of said support arms for moving the latter toward and away from the other support arm to move said gripper jaw members to and from gripping relation with said grip edges of said triangular protrusions, and means for restraining at least one of said gripper jaw members at diametrically opposite angular positions about the pivot axis thereof to support the workpiece in either of two relatively inverted positions, wherein said convergent grip edges of said fixture plate members are beveled edges of "V" shaped cross-section and said shaped contact surfaces of the foot members of said gripper jaw members are "V" shaped trough surfaces to interfit said beveled edges, and said foot members are recessed to define a cavity shaped to conform to the triangular shape of and receive in nested relation said triangular protrusions, and wherein said telescopically extensible crossbeam structure comprises a vertically spaced pair of parallel elongated horizontally disposed tube members fixed to one of said support arms and a pair of similarly spaced horizontal rods fixed to the other support arm and telescopically interfitted into said tube members, and said adjusting screw means includes a shaft journaled in one of the support arms having a hand knob for manipulation thereof and a screw thread portion threaded into nut means coupled to said crossbeam structure to effect extension and contraction of the crossbeam structure.

4. In a workpiece handling system including means for gripping, manipulating and releasing a fixtured workpiece assembly for transport to and from and positioning in a workpiece welding station to minimize contamination of the welds produced therein, the workpiece being formed of an array of metal members and fixture plate members therefor assembled in a fixtured grid assembly wherein generally triangular protrusions project oppositely from the fixtured plate members and have precision convergent grip edges and precision apertured locating holes therein; the welding station including a mounting plate for positioning the fixtured grid assembly providing a generally planiform support surface for the grid assembly; locating/latching pin assemblies for said mounting plate comprising locating pins projecting upwardly from said surface to extend into said locating holes in said triangular protrusions, a cantilevered and eccentrically mounted latching pin assembled with each locating pin having a latching head formation normally disposed in eccentric relation to and above the locating pin at a position to partially overlap surface portions of said triangular protrusions immediately bounding said locating holes for latching the grid assembly on said mounting plate when the grid assembly is properly positioned thereon, said latching pin having a shank portion capable of being flexed to a position concentrically aligning said head with the locating pin and associated locating hole releasing the grid assembly from latched relation for removal from the mounting plate, and contact means on said gripper jaw members for engaging said latching head formation to flex the latching pins to release position when the gripper jaw members reach a predetermined position adjacent said mounting plate.

5. In a workpiece handling system having locating-/latching pin assemblies as defined in claim 4, wherein said locating pins have a generally cylindrical upper portion projecting above said surface, and said latching head formation includes a circular cross-section portion of a diameter no greater than the diameter of said upper portion and an upwardly converging conical surface portion thereabove to be engaged by said contact means to cam said head formation to release position substantially concentric with said upper portion.

6. In a workpiece handling system having locating-/latching pin assemblies as defined in claim 4, wherein said locating pins have a generally cylindrical upper portion projecting above said surface having an upwardly opening socket therein, and said latching head formation includes a circular cross-section portion of a diameter no greater than the diameter of said upper portion and an upwardly converging conical surface portion thereabove to be engaged by said contact means to cam said head formation to release position substantially concentric with said upper portion and said shank portion of said latching pin being disposed in said socket.

7. A workpiece handling system as defined in claim 4 wherein said shank of said latching pin is of flat blade-like configuration along the portion adjoining said head and terminates at its opposite end in a screw thread end portion extending through a lower portion of said locating pin and protruding therebelow to be secured by a threaded nut.

8. A workpiece handling system as defined in claim 5 wherein said shank of said latching pin is of flat blade-like configuration along the portion adjoining said head and terminates at its opposite end in a screw thread end portion extending through a lower portion of said locating pin and protruding therebelow to be secured by a threaded nut.

9. A workpiece handling system as defined in claim 6 wherein said shank of said latching pin is of flat blade-like configuration along the portion adjoining said head and located within said socket and terminates at its opposite end in a screw thread end portion extending through a lower portion of said locating pin and protruding therebelow to be secured by a threaded nut.

* * * * *